(12) United States Patent
Heo

(10) Patent No.: US 11,399,117 B2
(45) Date of Patent: Jul. 26, 2022

(54) SUPPORTING FUNCTION OF IMAGE FORMING APPARATUS ACCORDING TO COMMON ACCOUNT LOGIN

(71) Applicant: Hewlett-Packard Development Company, L.P., Spring, TX (US)

(72) Inventor: Nam Heo, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/277,818

(22) PCT Filed: Jul. 19, 2019

(86) PCT No.: PCT/US2019/042614
§ 371 (c)(1),
(2) Date: Mar. 19, 2021

(87) PCT Pub. No.: WO2020/153986
PCT Pub. Date: Jul. 30, 2020

(65) Prior Publication Data
US 2021/0352191 A1    Nov. 11, 2021

(30) Foreign Application Priority Data

Jan. 23, 2019    (KR) .................. 10-2019-0008915

(51) Int. Cl.
*H04N 1/00*    (2006.01)
*H04N 1/44*    (2006.01)

(52) U.S. Cl.
CPC ....... *H04N 1/4433* (2013.01); *H04N 1/00411* (2013.01); *H04N 1/00413* (2013.01); *H04N 1/00511* (2013.01); *H04N 1/4413* (2013.01)

(58) Field of Classification Search
None
See application file for complete search history.

(56) References Cited

U.S. PATENT DOCUMENTS

| 7,209,250 B2 | 4/2007 | Nakao |
| 2009/0015860 A1 | 1/2009 | Jahn et al. |
| 2009/0161143 A1 | 6/2009 | Nakamoto |
| 2012/0192257 A1* | 7/2012 | Ishii ..................... H04N 1/4413 726/7 |
| 2013/0111045 A1* | 5/2013 | Ichikawa ............... H04L 63/08 709/228 |

(Continued)

FOREIGN PATENT DOCUMENTS

| JP | 2009-234036 A | 10/2009 |
| JP | 2010-198316 A | 9/2010 |

(Continued)

*Primary Examiner* — Henok Shiferaw
(74) *Attorney, Agent, or Firm* — Jefferson IP Law, LLP

(57) ABSTRACT

An image forming apparatus including a processor and a memory storing instructions executable by the processor is provided. The processor is to execute the instructions to perform processing for a login operation using a common account of a group of users to login a user of the group, obtain mapping information indicating a mapping of information related to the group in correspondence with the logged-in common account, and support a function of the image forming apparatus requested by the user of the group logged-in using the common account, based on the mapping information.

15 Claims, 10 Drawing Sheets

(56) References Cited

U.S. PATENT DOCUMENTS

| | | | |
|---|---|---|---|
| 2015/0334266 A1* | 11/2015 | Tsujimoto | H04N 1/00503 358/1.13 |
| 2016/0112584 A1* | 4/2016 | Park | G06F 3/1203 358/1.15 |
| 2016/0219166 A1* | 7/2016 | Nishino | G06F 3/1238 |
| 2017/0064120 A1* | 3/2017 | Chung | G06F 3/1258 |
| 2017/0070624 A1* | 3/2017 | Hanada | G03G 15/502 |
| 2017/0090832 A1* | 3/2017 | Ishibashi | G06F 3/1286 |
| 2017/0111247 A1* | 4/2017 | Uchiyama | G06F 3/1229 |
| 2018/0374007 A1* | 12/2018 | Hamada | G06F 3/1275 |
| 2019/0199883 A1* | 6/2019 | Nojiri | H04N 1/00474 |
| 2019/0361650 A1* | 11/2019 | Ren | H04N 1/4433 |
| 2020/0301629 A1* | 9/2020 | Yamanishi | G06F 3/1238 |
| 2021/0048964 A1* | 2/2021 | Deleverio | G06F 8/34 |

FOREIGN PATENT DOCUMENTS

| | | |
|---|---|---|
| JP | 2011-235505 A | 11/2011 |
| WO | WO-2015/047033 A1 | 4/2015 |
| WO | WO-2019/013481 A1 | 1/2019 |

\* cited by examiner

FIG. 4

| Input | Transformation | Output | COMMON ACCOUNT ID ABC | COMMON ACCOUNT ID DEF | COMMON ACCOUNT ID GHI |
|---|---|---|---|---|---|
| Mono Scan | OCR service in MFP | Mono Print | Y | – | Y |
| Color Scan | OCR service in ABC server | Color Print | Y | – | – |
| Input Fax | OCR service in DEF Cloud | Output Fax | Y | Y | – |
| Received Email | OCR service in GHI Cloud | Fax to ABC number | Y | – | – |
| Mono Scan | OCR service in MFP | Fax to DEF number | – | Y | – |
| Color Scan | OCR service in ABC server | Fax to GHI number | – | – | Y |
| Input Fax | OCR service in DEF Cloud | Send to ABC FTP server | – | – | – |
| Received Email | OCR service in GHI Cloud | Send to ABC DEF server | – | Y | – |

FIG. 6

| | Input | Transformation | Output |
|---|---|---|---|
| ✓ | Mono Scan | OCR service in MFP | Mono Print |
| ☐ | Color Scan | OCR service in ABC server | Color Print |
| ☐ | Input Fax | OCR service in DEF Cloud | Output Fax |
| ☐ | Received Email | OCR service in GHI Cloud | Fax to ABC number |

SUPPORTING FUNCTION OF IMAGE FORMING APPARATUS ACCORDING TO COMMON ACCOUNT LOGIN

BACKGROUND

When an image forming apparatus, such as a printer, a copy machine, a fax machine, a multiplexer, etc., is commonly used by a plurality of users, the users may perform a login operation through a user account to use the image forming apparatus.

The user account may include an individual account solely used by an individual.

BRIEF DESCRIPTION OF THE DRAWINGS

FIG. 4 is a table for describing a workflow stored in correspondence with a common account, according to an example;

FIG. 6 is a view for describing an example in which a workflow stored in correspondence with a logged-in common account is searched for and provided to a user, according to a request to execute a workflow function, and a workflow is created based on a user's selection and provided to the user;

DETAILED DESCRIPTION

Hereinafter, various examples will be described in detail with reference to the drawings. In addition, components having substantially the same functions are referred to by the same reference signs in the specification and the drawings not to give repeated descriptions.

Figure 1:
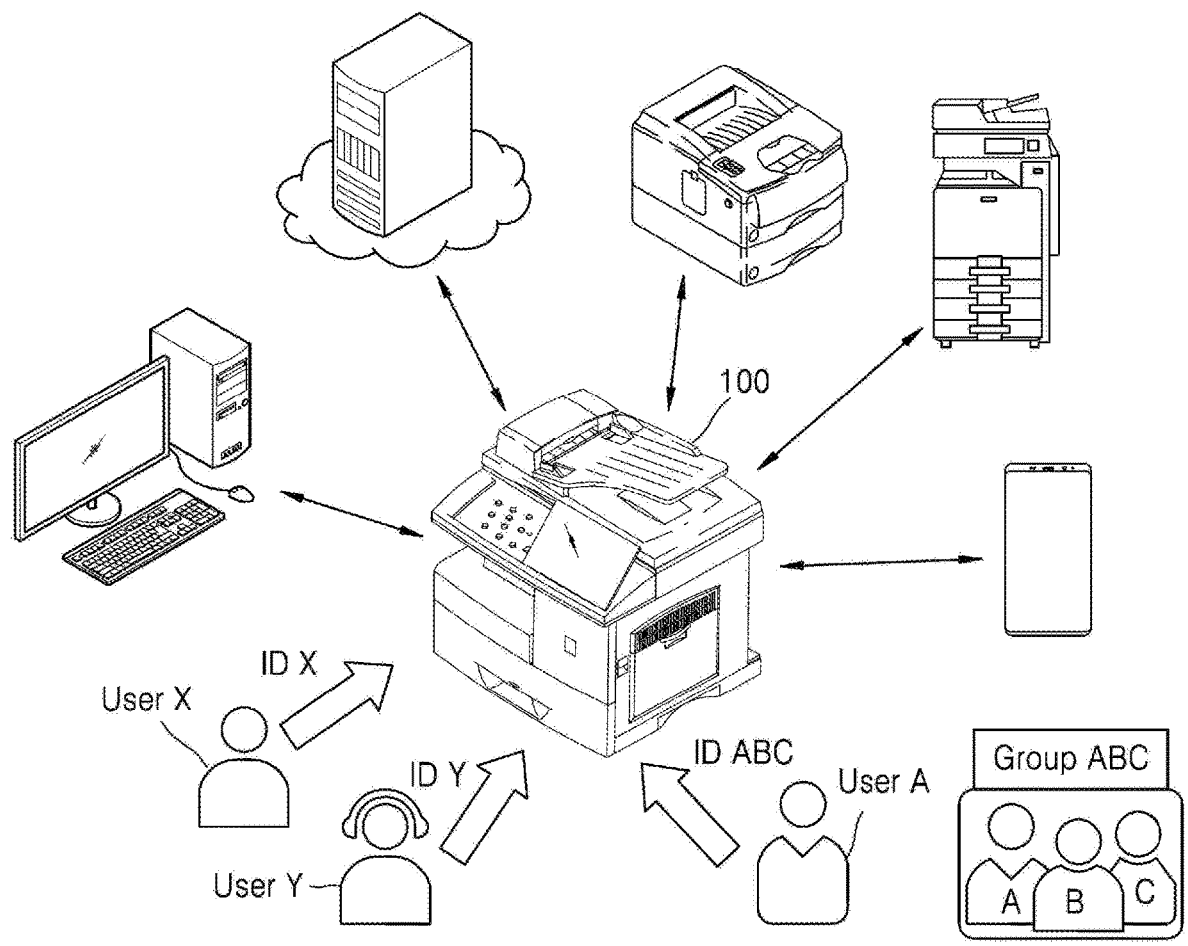
FIG. 1 is a view of an image forming apparatus, an external apparatus connected to the image forming apparatus, and a user using the image forming apparatus, according to an example.

FIG. 1 is a view of an image forming apparatus 100, an external apparatus connected to the image forming apparatus 100, and a user using the image forming apparatus 100, according to an example.

The image forming apparatus 100 collectively refers to a printer, a multiplexer, a copy machine, etc., and may perform an image forming job, such as printing, scanning, faxing, or the like. The image forming apparatus 100 may form an image on a recording medium, such as a printing paper, based on various printing methods differing based on types of the image forming apparatus 100. For example, the printing methods of the image forming apparatus 100 may include an electrophotography method, an inkjet method, a heat transfer method, a heat sensing method, etc.

The image forming apparatus 100 may be connected to the external apparatus so that the image forming apparatus 100 and the external apparatus may transmit and receive data to and from each other. The external apparatus may include a computer, a cloud, a server, other image forming apparatuses, a mobile apparatus such as a smartphone, or the like, etc.

A user of the image forming apparatus 100 may access the image forming apparatus 100 and execute a function of the image forming apparatus 100. The user may perform a login operation by inputting a user account to the image forming apparatus 100 to use the image forming apparatus 100.

When a plurality of users commonly use the image forming apparatus 100, each of the users may register his or her own individual account and may log in to the image forming apparatus 100 by using his or her own individual account to use the image forming apparatus 100. The individual accounts have to include unique identification information differing between the users, and thus, each user has to make up and register a user account having a new form not to overlap the individual user accounts of the other users.

The user account may include a common account commonly used by a specific body or group. The users may log in to the image forming apparatus 100 by using a common account instead of the individual accounts. Users affiliated with an identical group may register a common account to the image forming apparatus 100 and may use the common account instead of an individual account. When the image forming apparatus 100 is commonly used by the users belonging to the same group, it would be inconvenient for each of the users to create and register an individual account not overlapping that of the other users. Thus, the common account may be created and registered to the image forming apparatus 100 to be shared by the plurality of users to use the image forming apparatus 100.

In addition, one group may have a plurality of common accounts. In this case, the plurality of common accounts may have common information or common attribute values commonly mapped to the plurality of common accounts, as well as different information or different attribute values mapped to each of the plurality of common accounts. Each of the users included in the same group may perform a login operation using any one of the plurality of common accounts, according to an authority, a title, a function, or the like that each user is entitled with, within the group. The image forming apparatus 100 may perform processing for the login operation using any one of the plurality of common accounts, based on an input of each user or a group representative, an input received from a cloud or a server used by the group, or a sensing value of a sensor of the image forming apparatus 100.

As illustrated in FIG. 1, "User X" and "User Y" may log in to the image forming apparatus 100 by using "ID X" and "ID Y," respectively, which are their individual accounts. Meanwhile, "User A" belonging to "group ABC" may log in to the image forming apparatus 100 by using "ID ABC," which is a common account, rather than by using an individual account. "User B" and "User C" of "group ABC" may also log in to the image forming apparatus 100 by using "ID ABC," which is the common account. Like this, the users affiliated with the same group may commonly use the common account, and thus, any inconvenience incurred when each user has to register and use an individual account may be minimized. Hereinafter, when the image forming apparatus 100 is logged in to by using a common account, an operation of supporting a function of the image forming apparatus 100, based on information related to a group using the logged-in common account, rather than just using the common account for the login operation, will be described.

Figure 2:
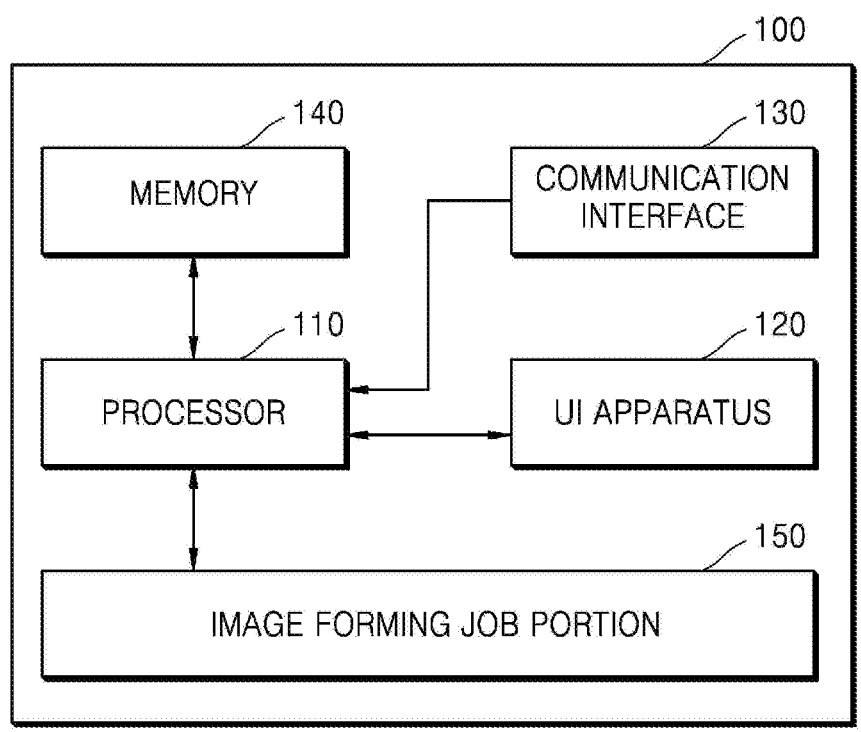
FIG. 2 is a flowchart for describing a structure of an image forming apparatus according to an example.

FIG. 2 is a flowchart for describing a structure of the image forming apparatus 100 according to an example.

Referring to FIG. 2, the image forming apparatus 100 may include a processor 110, a user interface (UI) apparatus 120, a communication interface 130, a memory 140, and an image forming job portion 150. Also, although not shown, the image forming apparatus 100 may further include a power portion configured to supply power to each of the components.

The processor 110 may control general operations of the image forming apparatus 100 and may include at least one processing unit, such as a central processing unit (CPU). The processor 110 may control other components included in the image forming apparatus 100 to perform operations in correspondence with user inputs received through the UI apparatus 120. The processor 110 may include at least one processing unit specialized in correspondence with each of functions, or may include an integrated processing unit. The processor 110 may execute a program stored in the memory 140, read data or files stored in the memory 140, or record new files in the memory 140.

The UI apparatus 120 may include an input portion configured to receive, from a user, an input for performing an image forming job, etc. and an output portion configured to display information, such as a result of performing the image forming job or a state of the image forming apparatus 100. For example, the UI apparatus 120 may be implemented in the form of a touch screen including an operation panel for receiving a user input, a display panel for displaying a screen, and the like.

The communication interface 130 may perform wired or wireless communication with other apparatuses or networks. To this end, the communication interface 130 may include communication modules for supporting at least one of various wired and wireless communication methods. The wireless communication may include, for example, wireless Fidelity (Wi-Fi), Wi-Fi direct, Bluetooth, ultra wide band (UWB), near field communication (NFC), etc. The wired communication may include, for example, Ethernet, universal serial bus (USB), high definition multimedia interface (HDMI), etc.

The communication interface 130 may be connected to an external apparatus arranged outside the image forming apparatus 100 and may transmit and receive signals or data to and from the external apparatus. The communication interface 130 may transmit the signals or the data received from the external apparatus to the processor 110 or may transmit signals or data generated from the processor 110 to the external apparatus.

The memory 140 may store instructions executable by the processor 110. The memory 140 may store programs, such as applications corresponding to respective functions of the image forming apparatus 100, files, etc. The memory 140 may store an operating system (OS).

The image forming job portion 150 may perform image forming jobs, such as printing, scanning, faxing, etc. The image forming job portion 150 may perform the image forming jobs based on a command reconstructed, in the main control board, from a user input received through the UI apparatus 120. For a print function, the image forming job portion 150 may form an image on a recording medium through various printing methods, such as an electrophotography method, an inkjet method, a thermal transfer method, a thermosensitive method, etc. For a scan function, the image forming job portion 150 may irradiate light onto a print paper and receive the reflected light to read an image recorded on the print paper. For a fax function, the image forming job portion 150 may scan an image and transfer the scanned file to a forwarding address, or may receive a file from the outside and print the received file.

The image forming apparatus 100 may receive a request from the user or provide services to the user via the UI apparatus 120, or via an external apparatus, such as a user terminal, through the communication interface 130.

The processor 110 may execute instructions stored in the memory 140, and when there is a login operation using a user account, such as an individual account or a common account, may perform processing with respect to the login operation according to a login authorization process.

The processor 110 may execute the instructions stored in the memory 140 to perform processing for the login operation using the common account. The processor 110 may obtain information related to a group using the logged-in common account and based on the obtained information related to the group, support a function of the image forming apparatus 100, requested by a user logged in using the common account.

The information related to the group may be obtained from the memory 140 in the image forming apparatus 100 or from the outside of the image forming apparatus 100 through the communication interface 130, by using the common account or group identification information for identifying a group. The image forming apparatus 100 may obtain and use the information related to the group, to support the function of the image forming apparatus 100. For example, when the information related to the group is used as setting information to perform the function of the image forming apparatus 100, the image forming apparatus 100 may obtain and use the information related to the group in order to support the function of the image forming apparatus 100. The information related to the group will be described hereinafter with reference to FIGS. 3 and 4.

Figure 3:
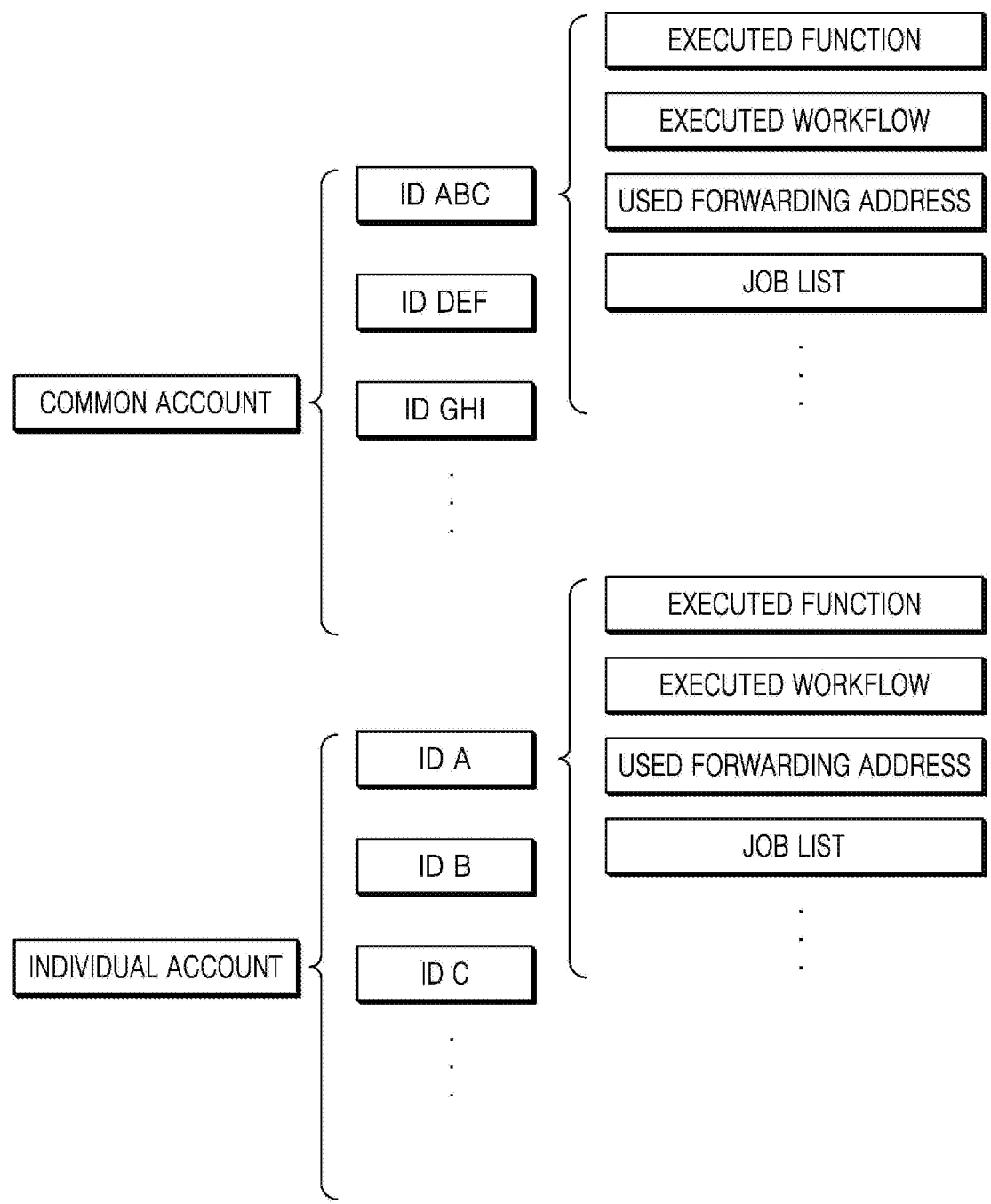
FIG. 3 is a diagram for describing information related to a group, namely, information mapped to a common account and an individual account, according to an example.

FIG. 3 is a diagram for describing information related to a group, namely, information mapped to a common account and an individual account, according to an example.

The information related to the group may include history information related to an image forming job mapped to the common account, open group information mapped to the common account, history information related to an image forming job mapped to an individual account of a member included in the group, open individual information mapped to an individual account of a member included in the group, etc. Here, the open group information or the open individual information may be information, the provision of which is agreed upon when a user is logged in using the common account, and may include both information explicitly authorized by the group or an individual user and information implicitly authorized by the group or the individual user. For example, the history information related to the image forming job mapped to the common account or the open group information mapped to the common account may include information about a function executed by a user logged in using the common account, information about a workflow executed by the user logged in using the common account, information about a forwarding address used by the user logged in using the common account, information about a job list related to the user logged in using the common account, etc.

Referring to FIG. 3, the image forming apparatus 100 may store a plurality of common accounts and a plurality of individual accounts. As illustrated in FIG. 3, the common accounts may include "ID ABC," "ID DEF," "ID GHI," etc., and the individual accounts may include "ID A," "ID B," "ID C," etc. A function executed by a user logged in using the common account, a work flow executed by the user, a forwarding address used by the user, a job list related to the user, etc., may be mapped and stored in each of the common accounts. Also, a function executed by a user logged in using the individual account, a work flow executed by the user, a forwarding address used by the user, a job list related to the user, etc., may be mapped and stored in each of the individual accounts. Here, the used forwarding address may include information about forwarding addresses recently or frequently used by the user logged in using the common account or the individual account, such as email addresses or fax numbers of customers of a group or other associated groups, cloud or server addresses used by the group, or email addresses or fax numbers of members affiliated with the group. The job list may include information about jobs recently or frequently used by the user logged in using the common account or the individual account.

The users included in the same group may have similar patterns of using the image forming apparatus 100 since they are included in the same group, and thus, the image forming apparatus 100 may map and store the history information related to the image forming job or the open group information in the common account that is commonly used. The history information related to the image forming job mapped to the common account may have a form in which a function or a workflow recently or frequently executed by the user logged in using the common account is stored in correspondence with the common account of the corresponding group.

FIG. 4 is a table for describing a workflow stored in correspondence with a common account, according to an example.

Based on operations and results corresponding to functions of the image forming apparatus 100, each function of the image forming apparatus 100 may be any one of an input application, a transformation application, and an output application for constructing a workflow. A result of executing the input application may correspond to an object to be input of the transformation application and the output application.

FIG. 4 illustrates information about the workflows executed by a user logged in using the common accounts, through the common accounts. The common accounts may include "ID ABC," "ID DEF," and "ID GHI," and "Y" is indicated for the workflow stored in correspondence with each of the common accounts. The image forming apparatus 100 may manage the information about the workflows stored in correspondence with the common accounts as a database, as illustrated in FIG. 4. For example, with respect to the common account "ID ABC," "Y" is indicated for top four workflows from among eight workflows illustrated in FIG. 4, so that later a user logged in using the common account "ID ABC" may search for and execute the workflows corresponding to the common account without regenerating the top four workflows for which "Y" is indicated.

Although not shown in FIGS. 3 and 4, information about functions of an image forming apparatus installed in a region in which a group is located may also correspond to the information related to the group. For example, when the group using the common account is a department of a company, information about functions of an image forming apparatus used by members of the department in a region of a building of the company, in which the department is located, may be included in the information related to the group.

The image forming apparatus 100 may support a function of the image forming apparatus 100 requested by the user logged in using the common account, based on the information related to the group described above. Hereinafter, examples of a method of supporting the function of the image forming apparatus 100 will be described.

Referring to FIG. 2 again, the processor 110 according to an example may execute the instructions stored in the memory 140 to determine a function of the image forming apparatus 100 requested by the user to be executed, set setting information to execute the determined function by using the obtained information related to the group, and perform the function of the image forming apparatus 100 based on the set setting information.

The processor 110 according to an example may execute the instructions stored in the memory 140 to receive, from the user, a request to execute a workflow function, search for a workflow stored in correspondence with the logged in common account, and provide the user with the found workflow.

When the provided workflow includes a plurality of workflows, the processor 110 according to an example may execute the instructions stored in the memory 140 to create a workflow according to a user operation of selecting any one of the plurality of workflows and provide the user with the workflow.

When the provided workflow includes a plurality of workflows, the processor 110 according to an example may execute the instructions stored in the memory 140 to create a workflow based on a combination of functions selected by the user from among a plurality of functions included in each of the plurality of workflows, and provide the user with the workflow.

The processor 110 according to an example may execute the instructions stored in the memory 140 to receive, from the user, a request to execute a workflow function and a request to create a workflow, provide the user with a list of a plurality of functions used to construct the workflow, by using information about functions of an image forming apparatus installed in a region in which the group is located, and create the workflow based on the user's selection with respect to the list of the plurality of functions and provide the user with the created workflow.

The processor 110 according to an example may execute the instructions stored in the memory 140 to receive, from the user, a request to execute a workflow function and a request to create a workflow, provide the user with a pop-up window to set each of the plurality of functions included in the workflow, by using information about functions of an image forming apparatus installed in a region in which the group is located, and create the workflow based on the user's selection with respect to the pop-up window and provide the user with the created workflow.

Figure 5:
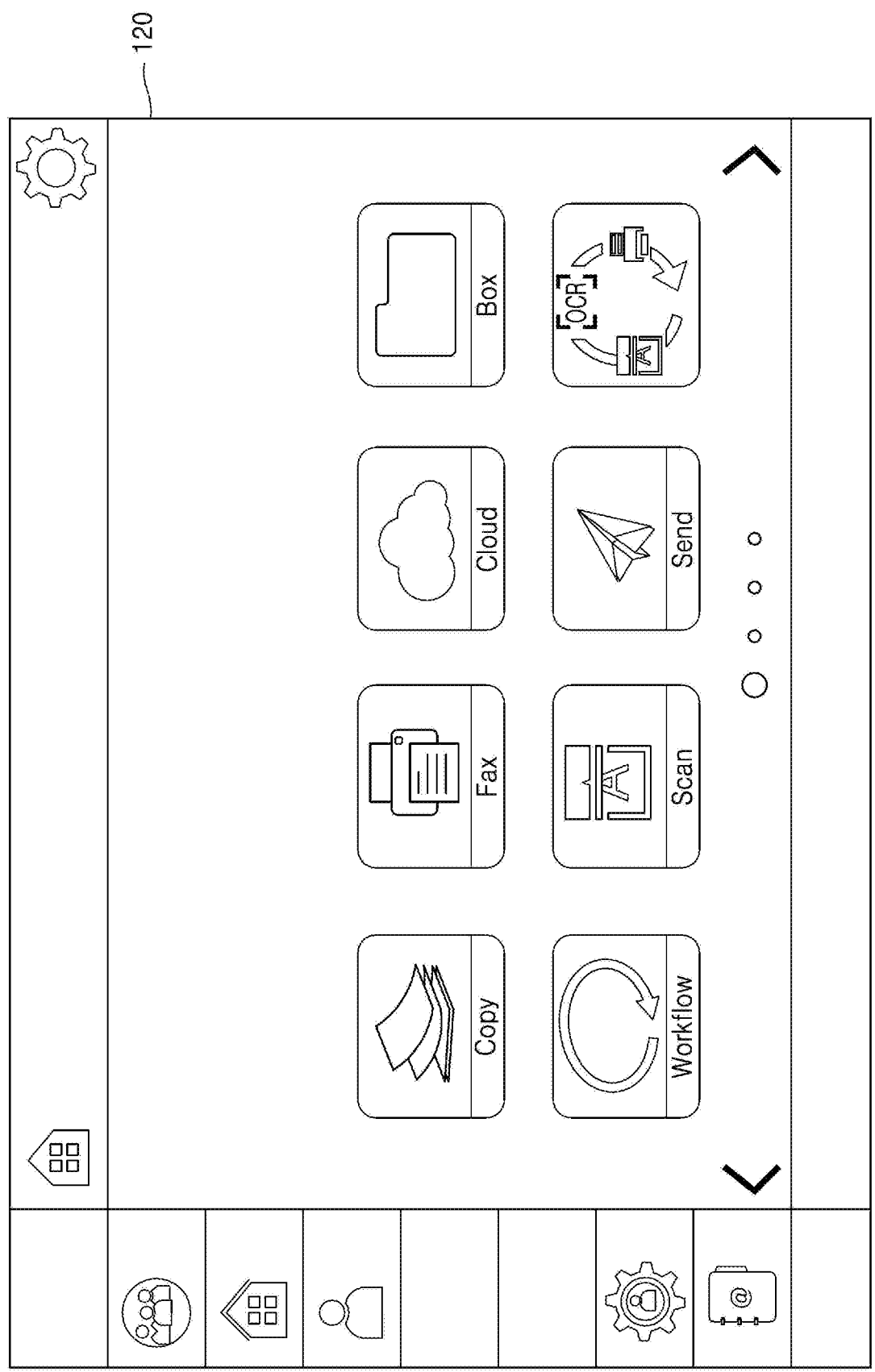
FIG. 5 is a view showing a home screen user interface (UI) when a login operation using a common account is performed, according to an example.

FIG. 5 is a view illustrating a home screen UI when a login operation using a common account is performed, according to an example.

Referring to FIG. 5, when the login operation using the common account is processed, application icons with respect to various functions of the image forming apparatus 100 that are executable based on the logged in common account are displayed on the home screen UI. A menu related to the common account, a menu related to the home screen UI, a menu related to an individual account, a menu related to user setting, a menu related to setting of a forwarding address, etc. are displayed on the left side of the home screen UI. However, the structure of the home screen UI is not limited to this structure, and may have various layouts.

On the home screen UI illustrated in FIG. 5, the applications icons corresponding to the functions of the image forming apparatus 100, such as shortcut icons for copying, faxing, cloud transmission, recording, workflows, scanning, transmission, and any other functions, are displayed. The functions of the image forming apparatus 100 may be performed by executing the corresponding application icons installed in the image forming apparatus 100.

The image forming apparatus 100 may determine a function of the image forming apparatus 100 requested by the user to be executed, set setting information to execute the determined function by using information related to a group using the logged in common account, and perform the function of the image forming apparatus 100 according to the set setting information. For example, when the user logged in using the common account executes an application icon corresponding to a fax function, the image forming apparatus 100 may determine that the execution of the fax function is requested, and perform the fax function by setting a fax receiving number by using information about a forwarding address used by the user logged in using the common account.

The workflow function may denote setting of content and orders of jobs for a user through a combination of various functions related to the image forming job. An application corresponding to the workflow function may include an application configured to create, display, and execute workflows combined by taking into account an order of applications corresponding to various functions, so that various functions of the image forming apparatus 100 are executed in an order. The image forming apparatus 100 may create a workflow performing jobs for a user, by combining various applications installed in the image forming apparatus 100, and provide the user with the created workflow.

FIG. 6 is a view for describing an example in which a workflow stored in correspondence with a logged-in common account is searched for and provided to a user, according to a request to execute a workflow function, and a workflow is created and provided to the user based on the user's selection.

Referring to FIG. 6, the image forming apparatus 100 may receive, from the user, the request to execute the workflow function, search for the workflow stored in correspondence with a logged in common account, and provide the user with the found workflow. When a plurality of workflows are provided, the user may select one of the plurality of workflows. As illustrated in FIG. 6, the user may select the workflow by using a check box and the workflow may be re-created based on the user's selection and provided to the user.

Figure 7:
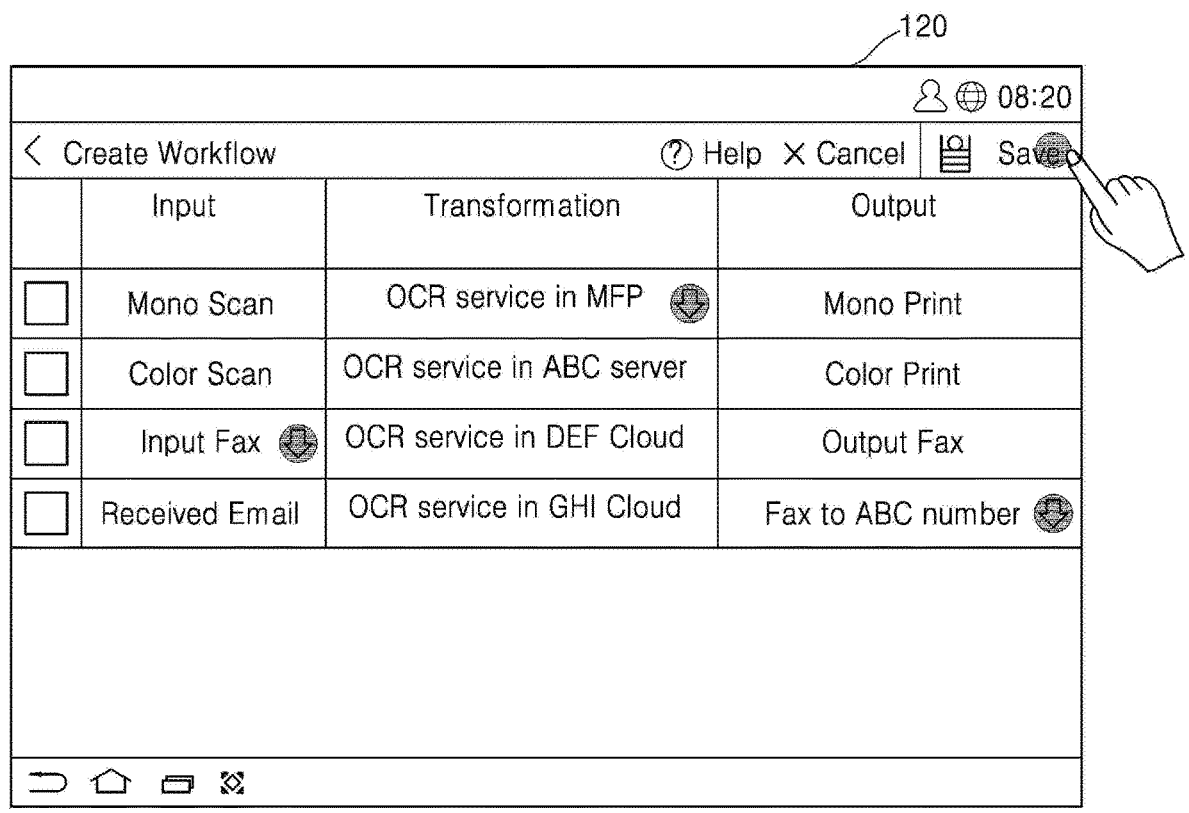
FIG. 7 is a view for describing another example in which a workflow stored in correspondence with a logged-in common account is searched for and provided to a user, according to a request to execute a workflow function, and a workflow is created based on the user's selection and provided to the user.

FIG. 7 is a view for describing another example in which a workflow stored in correspondence with a logged-in common account is searched for and provided to a user, according to a request to execute a workflow function, and a workflow is created and provided to the user based on the user's selection.

Referring to FIG. 7, the image forming apparatus 100 may receive, from the user, the request to execute the workflow function, search for the workflow stored in correspondence with the logged in common account, and provide the user with the found workflow. When a plurality of workflows are provided, the user may select one input application, one transformation application, and one output application from among a plurality of functions included in each of the plurality of workflows. As illustrated in FIG. 7, as the input application, an input application "Input Fax" of the third workflow may be selected, as the transformation application, a transformation application "OCR service in MFP" of the first workflow may be selected, and as the output application, an output application "Fax to ABC number" of the fourth workflow may be selected. Also, "save" may be selected to create a workflow based on the combination of the user's selections to provide a new form of workflow to the user.

Figure 8:
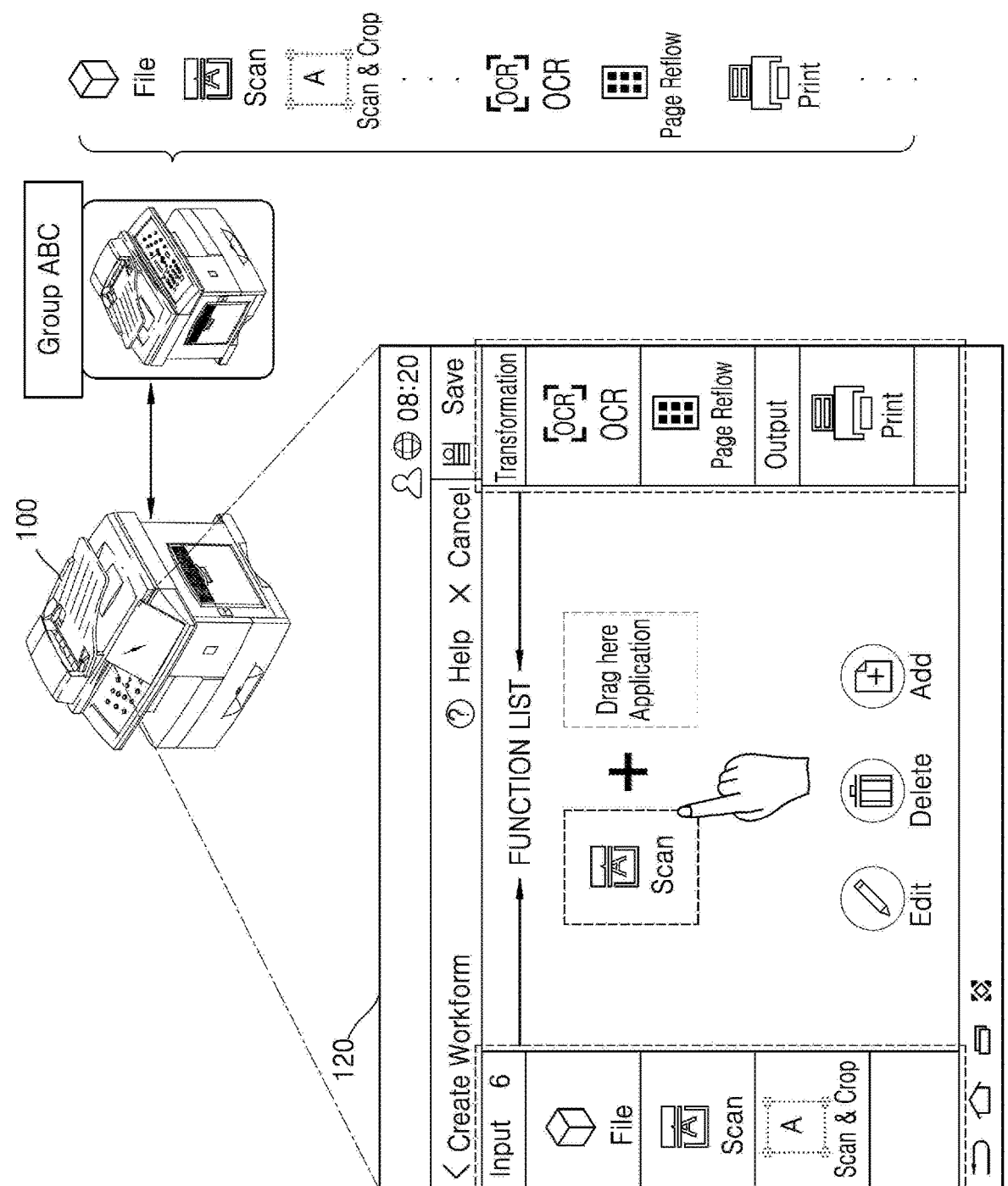
FIG. 8 is a view for describing an example in which a function list used to construct a workflow is provided and a workflow is created and provided to a user based on the user's selection with respect to the function list, in response to a request to execute a workflow function and a request to create a workflow.

FIG. 8 is a view for describing an example in which a function list used to construct a workflow is provided and a workflow is created and provided to a user based on the user's selection with respect to the function list, in response to a request to execute a workflow function and a request to create a workflow.

Referring to FIG. 8, the image forming apparatus 100 may receive, from the user, the request to execute the workflow function and the request to create the workflow, provide a function list used to construct the workflow by using function information of an image forming apparatus installed in a region in which a group is located, and create the workflow based on the user's selection with respect to the function list.

As illustrated in FIG. 8, the function list used to construct the workflow may be provided on an edge of a screen for creating the workflow in response to the request to create the work, by using the function information of the image forming apparatus installed in the region in which the group using the common account is located. As shown in the example illustrated in FIG. 8, the image forming apparatus 100 into which the user is logged using the common account may receive information about the functions supported by the image forming apparatus installed in the region in which "group ABC" is located, from the corresponding image forming apparatus, via the communication interface 130. When the information about the functions supported by the image forming apparatus installed in the region in which "group ABC" is located is received by the image forming apparatus 100, the image forming apparatus 100 may provide the function list used to construct the workflow at the edge portion of the UI apparatus 120, based on the received information about the functions. The user may sequentially select functions from the function list by taking into account an operation order of the workflow to be created.

As shown in the example illustrated in FIG. 8, an icon corresponding to a scan function may be moved according to a drag and drop method, in order to create the workflow. The image forming apparatus 100 may create and provide the workflow to the user based on the user's selection with respect to the function list based on the drag and drop method.

Figure 9:
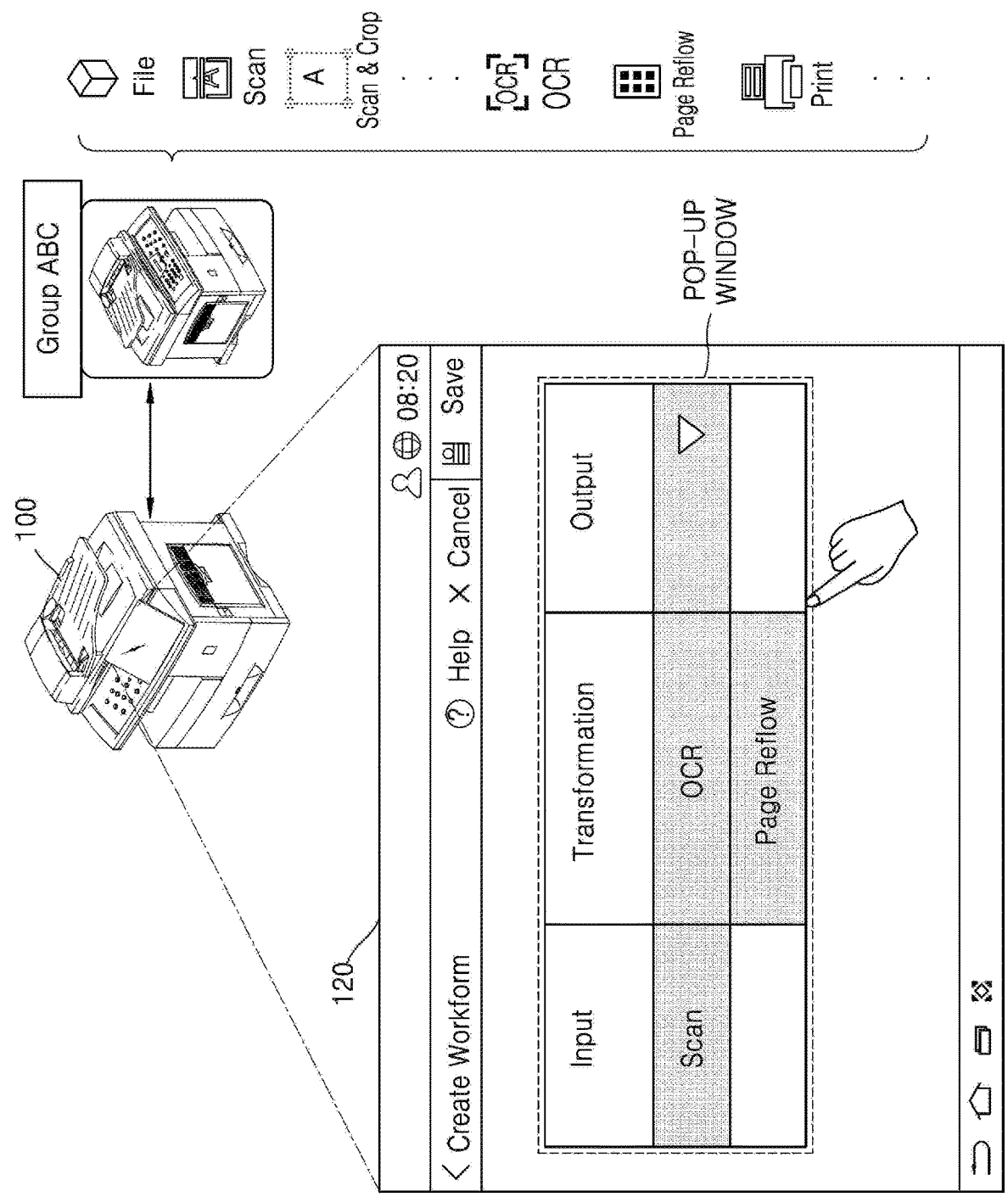
FIG. 9 is a view for describing an example in which a pop-up window for setting each of a plurality of functions included in a workflow is provided and a workflow is created and provided to a user based on the user's selection on the pop-up window, in response to a request to execute a workflow function and a request to create the workflow.

FIG. 9 is a view for describing an example in which a pop-up window for setting each of a plurality of functions included in a workflow is provided and a workflow is created and provided to a user based on the user's selection on the pop-up window, in response to a request to execute a workflow function and a request to create the workflow.

Referring to FIG. 9, the image forming apparatus 100 may receive, from the user, the request to execute the workflow function and the request to create the workflow, provide the pop-up window for setting each of the plurality of functions included in the workflow by using function information of an image forming apparatus installed in a region in which a group is located, and create the workflow based on the user's selection with respect to the pop-up window.

As shown in the example illustrated in FIG. 9, the image forming apparatus 100 into which the user is logged using the common account may receive information about the functions supported by the image forming apparatus installed in the region in which "group ABC" is located, from the corresponding image forming apparatus, via the communication interface 130. When the information about the functions supported by the image forming apparatus installed in the region in which "group ABC" is located is received by the image forming apparatus 100, the image forming apparatus 100 may provide the pop-up window for setting each of the plurality of functions included in the workflow, based on the received information about the functions, via the UI apparatus 120.

As shown in the example illustrated in FIG. 9, each of an input application, a transformation application, and an output application may be selected on the pop-up window having a drop-down method in order to create the workflow. The image forming apparatus 100 may create the workflow based on the user's selection with respect to the pop-up window and provide the created workflow to the user.

The workflow created and provided to the user according to the examples described with reference to FIGS. 6 through 9, respectively, may be executed in response to a user's request of execution.

Figure 10:
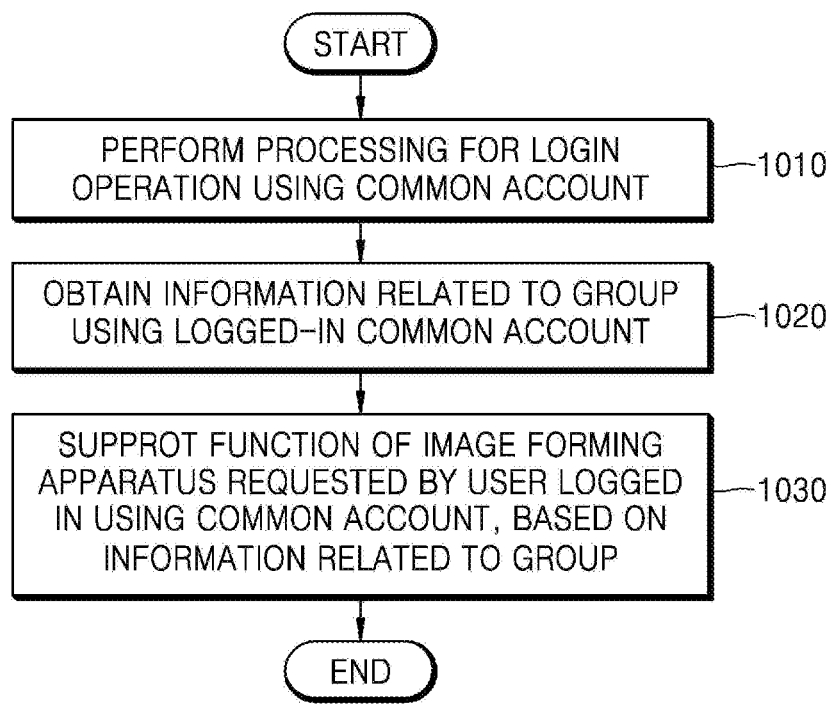
FIG. 10 is a flowchart of an operating method of an image forming apparatus, according to an example.

FIG. 10 is a flowchart for describing an operating method of the image forming apparatus 100, according to an example.

In block 1010, the image forming apparatus 100 may perform processing for a login operation using a common account.

In block 1020, the image forming apparatus 100 may obtain information related to a group using the logged in common account. The information related to the group may include history information related to an image forming job mapped to the common account, open group information mapped to the common account, history information related to an image forming job mapped to an individual account of a member included in the group, open private information mapped to the individual account of the member included in the group, etc. Function information of an image forming apparatus installed in a region in which the group is located may also correspond to the information related to the group.

In block 1030, the image forming apparatus 100 may support a function of the image forming apparatus 100 requested by the user logged in using the common account, based on the obtained information related to the group.

For example, the image forming apparatus 100 may determine a function of the image forming apparatus 100 requested by the user to be executed, set setting information to execute the determined function by using the obtained information related to the group, and perform the function of the image forming apparatus 100 based on the set setting information.

As another example, the image forming apparatus 100 may receive, from a user, a request to execute a workflow function, search for a workflow stored in correspondence with the logged in common account, and provide the found workflow to the user.

When the provided workflow includes a plurality of workflows, the image forming apparatus 100 may create a workflow based on a user operation of selecting any one from among the plurality of workflows and provide the workflow to the user.

When the provided workflow includes a plurality of workflows, the image forming apparatus 100 may create the workflow based on a combination of functions selected by the user from among a plurality of functions included in each of the plurality of workflows and provide the workflow to the user.

As another example, the image forming apparatus 100 may receive, from a user a request to execute a workflow function and a request to create a workflow, provide a function list used to construct the workflow by using information of functions of an image forming apparatus installed in a region in which a group is located, and create and provide the workflow to the user based on the user's selection with respect to the function list. As another example, the image forming apparatus 100 may receive, from a user, a request to execute a workflow function and a request to create the workflow, provide a pop-up window for setting each of a plurality of functions included in the workflow by using information of functions of an image forming apparatus installed in a region in which a group is located, and create and provide the workflow to the user based on a the user's selection with respect to the pop-up window.

The operating method of the image forming apparatus 100 described above may be implemented by a computer-readable recording medium having recorded thereon data or instructions executable by a computer or a processor. Also, the method may be recorded as a program executable by a computer and may be implemented by a general-purpose digital computer executing the program by using a computer-readable recording medium. The computer-readable recording medium may include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage apparatuses, optical data storage apparatuses, hard disks, solid-state disks (SSD), and any apparatus capable of storing machine readable instructions, related data, data files, and data structures and providing the machine readable instructions, the related data, the data files, and the data structures to a processor or a computer so that the processor or the computer may execute the instructions.

What is claimed is:

1. An image forming apparatus comprising:
   a processor; and
   a memory storing instructions executable by the processor,
   wherein the processor is to execute the instructions to,
      perform processing for a login operation using a common account of a group of users to login a user of the group to the common account,
      obtain mapping information indicating a mapping of information related to the group in correspondence with the logged-in common account, based on the mapping information, display a user interface including a menu of at least one function that is executable by the image forming apparatus, and perform a function of the image forming apparatus selected from the menu of the at least one function by the user of the group logged-in using the common account.

2. The image forming apparatus of claim 1,
wherein the mapping information includes setting information, and
wherein the processor is to execute the instructions to,
determine from the mapping information the function of the image forming apparatus selected by the user of the group to be executed,
set the setting information required to execute the determined function using the setting information included in the mapping information, and
perform the function of the image forming apparatus based on the set setting information.

3. The image forming apparatus of claim 1,
wherein the mapping information includes information indicating a workflow, and
wherein the processor is to execute the instructions to,
receive, from the user, a request to execute a workflow,
search in the mapping information for a workflow in correspondence with the logged-in common account, and
provide the user with the searched workflow.

4. The image forming apparatus of claim 3, wherein, based on the searched workflow comprising a plurality of workflows, the processor is to execute the instructions to,
select a workflow based on a user selection of any one of the plurality of workflows and
provide the user with the selected workflow.

5. The image forming apparatus of claim 3, wherein, based on the searched workflow comprising a plurality of workflows, each workflow including a plurality of workflow functions, the processor is to execute the instructions to,
construct a new workflow based on a combination of workflow functions selected by the user from among the plurality of workflow functions included in each of the plurality of workflows, and
provide the user with the constructed new workflow.

6. The image forming apparatus of claim 1, wherein the processor is to,
receive, from the user, a request to construct a workflow to correspond in the mapping information with the logged-in common account and to execute the workflow in response to a request,
provide the user with a list of a plurality of functions used to construct the workflow by using function information of an image forming apparatus installed in a region in which the group is located, or a pop-up window to set each of the plurality of functions used to construct the workflow, and
construct and provide the workflow to the user based on the user selections from the list of the plurality of functions or the pop-up window.

7. The image forming apparatus of claim 1, wherein the obtained mapping information includes at least one of history information related to an image forming job, open group information, history information related to an image forming job mapped to an individual account of a member included in the group, or open private information mapped to the individual account of the member included in the group.

8. An operating method of an image forming apparatus, the method comprising:
performing processing for a login operation using a common account of a group of users to login a user of the group to the common account;
obtaining mapping information indicating a mapping of information related to the group in correspondence with the logged-in common account;
based on the mapping information, displaying a user interface including a menu of at least one function that is executable by the image forming apparatus; and
performing a function of the image forming apparatus selected from the menu of the at least one function by the user of the group logged in using the common account.

9. The method of claim 8, wherein the mapping information includes setting information, and the performing of the function of the image forming apparatus comprises:
determining from the mapping information the function of the image forming apparatus selected by the user of the group to be executed;
setting the setting information required to execute the determined function using the setting information included in the mapping information; and
performing the function of the image forming apparatus based on the set setting information.

10. The method of claim 8, wherein the mapping information includes information indicating a workflow, and the performing of the function of the image forming apparatus comprises:
receiving, from the user, a request to execute a workflow;
searching in the mapping information for a workflow in correspondence with the logged-in common account; and
providing the user with the searched workflow.

11. The method of claim 10, wherein the performing of the function of the image forming apparatus further comprises:
based on the searched workflow comprising a plurality of workflows, selecting a workflow based on the user selection of any one of the plurality of workflows; and
providing the user with the created selected workflow.

12. The method of claim 10, wherein the performing of the function of the image forming apparatus further comprises:
based on the searched workflow comprising a plurality of workflows, each workflow including a plurality of workflow functions, constructing a new workflow based on a combination of workflow functions selected by the user from among the plurality of workflow functions included in each of the plurality of workflows, and
providing the user with the constructed new workflow.

13. The method of claim 8, wherein the performing of the function of the image forming apparatus comprises:
receiving, from the user, a request to construct a workflow to correspond in the mapping information with the logged-in common account and to execute the workflow in response to a request;
providing the user with a list of a plurality of functions used to construct the workflow by using function information of an image forming apparatus installed in a region in which the group is located, or providing the user with a pop-up window to set each of the plurality of functions used to construct the workflow; and constructing and providing the workflow to the user based on the user selections from the list of the plurality of functions or the pop-up window.

14. The method of claim 8, wherein the obtained mapping information includes at least one of history information related to an image forming job, open group information, history information related to an image forming job mapped to an individual account of a member included in the group, or open private information mapped to the individual account of the member included in the group.

15. A non-transitory computer-readable recording medium having recorded thereon instructions executable by a processor, the instructions comprising:
   instructions to perform processing for a login operation using a common account of a group of users to login a user of the group to the common account;
   instructions to obtain mapping information indicating a mapping of information related to the group in correspondence with the logged-in common account;
   instructions to, based on the mapping information, display a user interface including a menu of at least one function that is executable by an image forming apparatus; and
   instructions to perform a function of the image forming apparatus selected from the menu of the at least one function by the user of a group logged in using the common account.

* * * * *